(12) United States Patent
Siddabathuni et al.

(10) Patent No.: US 12,261,744 B2
(45) Date of Patent: *Mar. 25, 2025

(54) FABRIC AVAILABILITY AND SYNCHRONIZATION

(71) Applicant: Oracle International Corporation, Redwood Shores, CA (US)

(72) Inventors: Ajoy C. Siddabathuni, Santa Clara, CA (US); Bjorn Dag Johnsen, Oslo (NO); Raghunath Shenbagam, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,509

(22) Filed: Nov. 30, 2023

(65) Prior Publication Data
US 2024/0097979 A1  Mar. 21, 2024

Related U.S. Application Data

(63) Continuation of application No. 17/147,327, filed on Jan. 12, 2021, now Pat. No. 11,870,646.

(51) Int. Cl.
*H04L 41/082* (2022.01)
*H04L 41/0659* (2022.01)
(Continued)

(52) U.S. Cl.
CPC ........ *H04L 41/082* (2013.01); *H04L 41/0661* (2023.05); *H04L 41/084* (2013.01); *H04L 41/0856* (2013.01); *H04L 41/0886* (2013.01)

(58) Field of Classification Search
CPC . H04L 41/082; H04L 41/0661; H04L 41/084; H04L 41/0856; H04L 41/0886;
(Continued)

(56) References Cited

U.S. PATENT DOCUMENTS 6,034,948 A * 3/2000 Nakamura ........ H04L 12/40013
370/242
6,954,436 B1  10/2005 Yip et al.
(Continued)

FOREIGN PATENT DOCUMENTS

CN  111399873 A  *  7/2020
WO  2020160034 A1  8/2020

OTHER PUBLICATIONS

Final Office Action for U.S. Appl. No. 17/147,327, dated Mar. 31, 2022.
(Continued)

*Primary Examiner* — Kamal B Divecha
*Assistant Examiner* — Vinh Nguyen
(74) *Attorney, Agent, or Firm* — MUGHAL GAUDRY & FRANKLIN PC

(57) ABSTRACT

Aspects of the present disclosure include implementing fabric availability and synchronization (FAS) agents within a fabric network. In one example, a first FAS agent executing on a first network device may receive, from a second network device, a command to modify a configuration of a second network device. The first FAS may upgrade the configuration of the first network device based on the command from a current configuration to a new configuration. The first FAS agent increment a state identifier associated with the configuration of the first network device to a new state identifier associated with the new configuration. The first FAS agent may then transmit a control packet that includes the new state identifier. A second FAS agent executing on the second network device may receive the control packet and execute the command to update the configuration of the second network device to the new configuration.

15 Claims, 5 Drawing Sheets

(51) Int. Cl.
*H04L 41/08* (2022.01)
*H04L 41/084* (2022.01)
*H04L 41/0853* (2022.01)

(58) Field of Classification Search
CPC ..... H04L 41/40; H04L 43/20; H04L 41/0895; H04L 41/044; H04L 41/0833; H04L 41/0863; H04L 41/0866; H04L 41/122; H04L 43/0888; H04L 41/046; H04L 43/0805; H04L 41/0806
See application file for complete search history.

(56) References Cited

U.S. PATENT DOCUMENTS

| | | | |
|---|---|---|---|
| 7,602,756 B2 | 10/2009 | Gu et al. | |
| 8,363,549 B1 * | 1/2013 | Zhu | H04L 63/0218 709/227 |
| 8,605,604 B1 * | 12/2013 | Mohan | H04L 41/145 375/226 |
| 8,976,800 B1 | 3/2015 | Dropps et al. | |
| 9,130,841 B2 * | 9/2015 | Tornqvist | H04L 41/0663 |
| 9,240,951 B2 * | 1/2016 | Sadeghi | H04L 47/39 |
| 9,485,134 B2 | 11/2016 | Attanasio et al. | |
| 9,516,003 B2 * | 12/2016 | Menon | H04L 67/02 |
| 9,529,579 B2 * | 12/2016 | Brunet | G06F 8/65 |
| 9,553,788 B1 | 1/2017 | Callan | |
| 9,626,177 B1 * | 4/2017 | Madduri | G06F 8/65 |
| 9,667,496 B2 | 5/2017 | Chunn et al. | |
| 10,007,502 B2 * | 6/2018 | Fan | H04L 41/0856 |
| 10,250,497 B1 | 4/2019 | Jose et al. | |
| 10,678,529 B1 | 6/2020 | Farhan et al. | |
| 10,819,577 B2 | 10/2020 | Prabhu | |
| 10,862,809 B2 | 12/2020 | Roberts | |
| 10,917,378 B1 | 2/2021 | Majhi | |
| 10,951,652 B1 * | 3/2021 | Sharifi Mehr | H04L 63/0807 |
| 2002/0083156 A1 | 6/2002 | Wysoczynski | |
| 2006/0059540 A1 | 3/2006 | Hammons et al. | |
| 2009/0094354 A1 | 4/2009 | Rastogi et al. | |
| 2009/0247122 A1 * | 10/2009 | Fitzgerald | G06F 21/88 455/410 |
| 2010/0070963 A1 | 3/2010 | Bae et al. | |
| 2012/0311116 A1 | 12/2012 | Jalan et al. | |
| 2013/0031226 A1 * | 1/2013 | Liverance | H04L 67/34 709/221 |
| 2013/0297757 A1 | 11/2013 | Han et al. | |
| 2013/0304699 A1 | 11/2013 | Johnsen et al. | |
| 2013/0339940 A1 * | 12/2013 | Goel | H04L 41/082 717/172 |
| 2014/0068584 A1 | 3/2014 | Lim et al. | |
| 2014/0188803 A1 * | 7/2014 | James | G06F 16/178 707/638 |
| 2014/0237095 A1 | 8/2014 | Bevilacqua-Linn | |
| 2014/0317255 A1 * | 10/2014 | Krishna | H04L 41/0853 709/223 |
| 2015/0095880 A1 | 4/2015 | Lee | |
| 2015/0178064 A1 * | 6/2015 | Cairns | G06F 8/65 717/171 |
| 2015/0188760 A1 | 7/2015 | Anumala et al. | |
| 2016/0087885 A1 | 3/2016 | Tripathi et al. | |
| 2016/0112252 A1 | 4/2016 | Notari | |
| 2016/0191316 A1 * | 6/2016 | Guntaka | H04L 41/082 370/254 |
| 2016/0202972 A1 * | 7/2016 | Sass | G06F 8/75 717/121 |
| 2016/0218955 A1 * | 7/2016 | Logue | H04L 9/40 |
| 2017/0085488 A1 | 3/2017 | Bhattacharya et al. | |
| 2017/0111445 A1 * | 4/2017 | Kunde | H04L 67/10 |
| 2018/0088928 A1 * | 3/2018 | Smith | H04L 67/34 |
| 2018/0101376 A1 | 4/2018 | Olarig et al. | |
| 2018/0113728 A1 | 4/2018 | Musani | G06F 11/362 |
| 2018/0356979 A1 * | 12/2018 | Yu | G06F 3/061 |
| 2019/0028337 A1 * | 1/2019 | Ryu | H04W 8/02 |
| 2019/0068401 A1 | 2/2019 | Johnsen et al. | |
| 2019/0149463 A1 | 5/2019 | Bajaj et al. | |
| 2019/0171442 A1 | 6/2019 | Machida | |
| 2019/0260636 A1 * | 8/2019 | Sun | H04W 16/02 |
| 2019/0327133 A1 * | 10/2019 | Gao | H04W 48/16 |
| 2019/0342143 A1 | 11/2019 | Lin | |
| 2019/0379731 A1 | 12/2019 | Johnsen et al. | |
| 2020/0034263 A1 * | 1/2020 | Ebara | G06F 12/0813 |
| 2020/0045594 A1 * | 2/2020 | Peng | H04W 36/0033 |
| 2020/0084188 A1 * | 3/2020 | Wysocki | H04L 67/34 |
| 2020/0120535 A1 * | 4/2020 | Dai | H04W 76/18 |
| 2020/0146090 A1 * | 5/2020 | Hsu | H04W 8/082 |
| 2020/0183811 A1 | 6/2020 | Krishnan et al. | |
| 2020/0195557 A1 | 6/2020 | Duan et al. | |
| 2020/0201825 A1 | 6/2020 | Vijayan | |
| 2020/0336419 A1 * | 10/2020 | Doering | H04L 41/40 |
| 2020/0344236 A1 * | 10/2020 | Sanghavi | G06F 21/31 |
| 2020/0351164 A1 | 11/2020 | Nathaniel et al. | |
| 2020/0403847 A1 | 12/2020 | Goodman et al. | |
| 2021/0081536 A1 | 3/2021 | Zhang et al. | |
| 2021/0119872 A1 | 4/2021 | Katz et al. | |
| 2021/0136146 A1 | 5/2021 | Welsch et al. | |
| 2021/0211349 A1 | 7/2021 | Grant et al. | |

OTHER PUBLICATIONS

Final Office Action for U.S. Appl. No. 17/147,327, dated May 5, 2023.
International Search Report and Written Opinion for PCT Application No. PCT/US2022/011944, dated Apr. 28, 2022.
Notice of Allowance for U.S. Appl. No. 17/147,327, dated Aug. 30, 2023.
Office Action for U.S. Appl. No. 17/147,327, dated Nov. 3, 2022.
Office Action for U.S. Appl. No. 17/147,327, dated Sep. 7, 2021.
Communication under Rule 71(3) for European Patent Application No. 22703121.8, date May 31, 2024.
Non-Final Office Action for U.S. Appl. No. 18/525,517, dated Aug. 15, 2024.

* cited by examiner

FABRIC AVAILABILITY AND SYNCHRONIZATION

CLAIM OF PRIORITY

This application is a continuation of U.S. patent application Ser. No. 17/147,327 filed Jan. 12, 2021, entitled "FABRIC AVAILABILITY AND SYNCHRONIZATION," which is hereby incorporated by reference in its entirety and for all purposes.

TECHNICAL FIELD

This disclosure generally relates to distributed network management. More specifically, but not by way of limitation, this disclosure relates to fabric availability and synchronizations agents for the management of a fabric network.

BACKGROUND

Modern networks are often managed by multiple interconnected devices. A business network, for example, may include a large quantity of workstations. The network may be managed by network administrators that employ a series of routers and/or switches to manage communications for the workstations. Some networks, such as networks operated across college campuses or very large businesses, may operate across large geographical areas. To maintain connectivity, these networks may employ layers of network devices that relay communications across the network to a central server or trunk. A micro layer may maintain connectivity in particular microlocations (such as a building), and a macro layer may maintain connectivity across multiple microlocations (such as the networks of multiple buildings). When network devices of the micro or macro layer stop operating (e.g., server maintenance, software fault, network intrusion, etc.), communications across the network may become irrevocably disrupted.

SUMMARY

Methods and systems may relate to updating a configuration of network devices in a fabric network. A method can include: receiving, at a first network device in a fabric network and from a second network device in the fabric network, an identification of a command to modify a current configuration of the second network device, wherein the first network device is configured according to the current configuration; authenticating, by a first fabric availability and synchronization (FAS) agent executing on the first network device, the command; modifying, by the first network device in response to authenticating the command, the current configuration of the first network device based on the command, wherein modifying the current configuration of the first network device defines a new configuration; storing an identification of the command; updating, in response modifying the current configuration of the first network device, a state identifier associated with the current configuration of the first network device to correspond to a new state identifier associated with the new configuration; and transmitting, by the first FAS agent to a second FAS agent executing on the second network device of the fabric network, a control packet that includes the new state identifier, wherein upon receiving the control packet, the second FAS agent retrieves the identification of the command and implements the command on the second network device to upgrade the current configuration of the second network device to the new configuration.

Another aspect of the present disclosure includes a system comprising one or more processors and a non-transitory computer-readable media that includes instructions that, when executed by the one or more processors, cause the one or more processors to perform part or all of a method described herein.

Another aspect of the present disclosure includes a non-transitory computer-readable media that includes instructions that when executed by one or more processors, cause the one or more processors to perform part or all of one or more methods described herein.

These illustrative examples are mentioned not to limit or define the disclosure, but to provide examples to aid understanding thereof. Additional embodiments are discussed in the Detailed Description, and further description is provided there.

DETAILED DESCRIPTION

Figure 1:
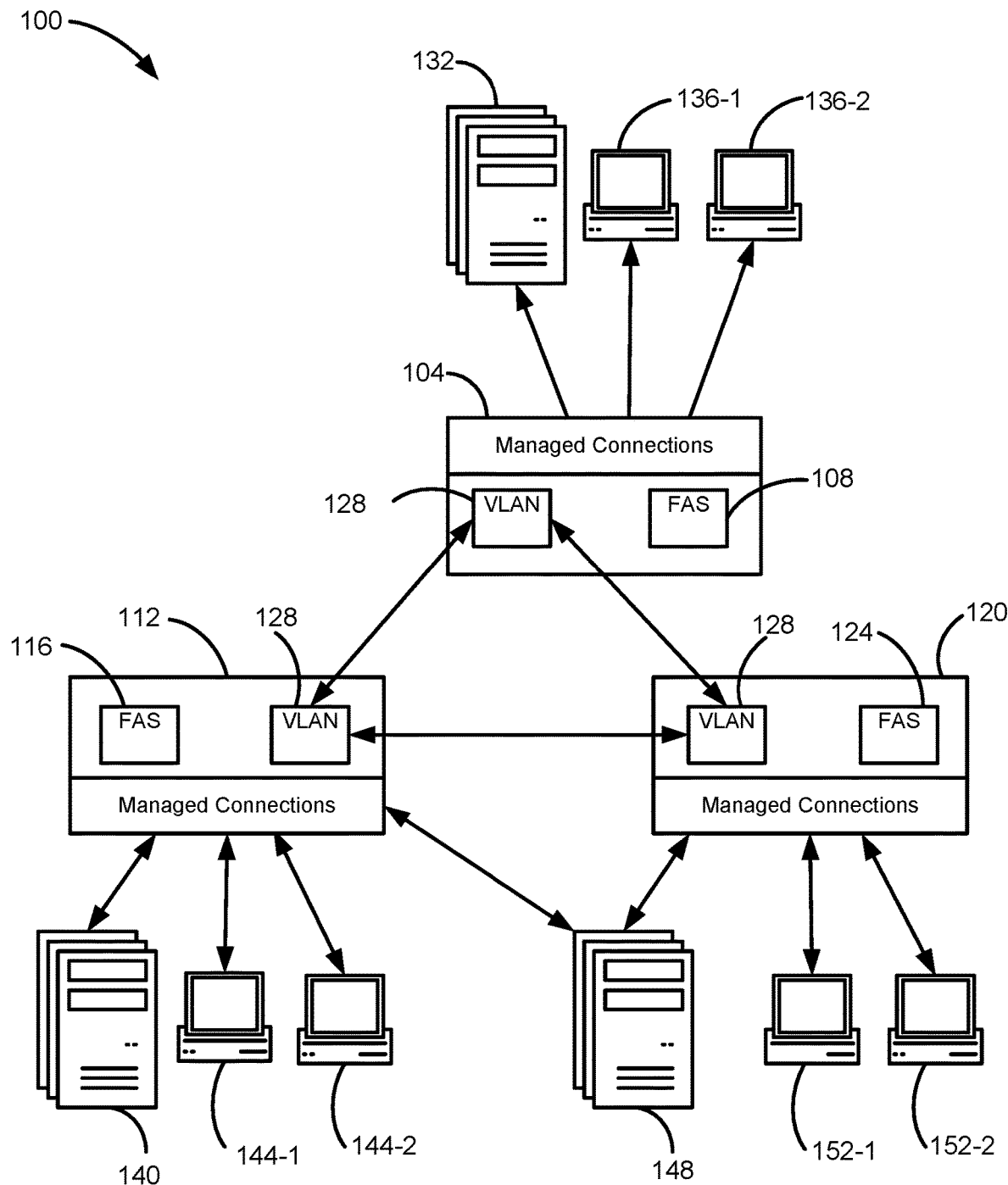
FIG. 1 depicts an example of a fabric network according to aspects of the present disclosure.

The present disclosure relates to an improved network topology managed semi-autonomously by fabric availability and synchronization (FAS) agents. Networks are often managed using network devices (e.g., devices that facilitate communications with other devices) that connect devices to other devices within the network and to devices external to the network. Large networks with a large quantity of connected devices and/or devices that are dispersed across a large geographical area may employ a large quantity of network devices to connect all of the devices of the network. These large networks may operate a fabric network (e.g., sometimes referred to as a switched fabric), in which devices of the network are interconnected via multiple network devices (as distinguished from a broadcast network in which one network device exclusively manages communications for a number of devices).

Network devices of the fabric network may be provisioned with fabric availability and synchronization agents to manage the operations of the fabric network and the network devices that make up the fabric network. In some instances, other devices of the network (e.g., workstations, servers, etc.) may also be provisioned with a FAS agent. A FAS agent manages the operations of the network device on which it executes and communicates with other FAS agents to synchronize the operations of the fabric network. The FAS agents may provide fabric-level management of the network devices that enables management of the network devices of the fabric network from a single network device.

When FAS agents are executed, the FAS agents may automatically define a hierarchy of FAS agents based on one or more characteristics of the FAS agents or characteristics of the networks devices on which the FAS agents execute. For instance, the FAS agents may determine, based on the characteristics of each FAS agent or network device, which FAS agent would be most suitable to operate as a primary FAS agent. Examples of one or more characteristics may include, but are not limited to, available bandwidth, available processing resources processor and/or memory, a quantity of devices connected to the network device, quality of a connection with another network device or server, or the like.

In one example, to determine the primary FAS agent, each FAS may derive a priority value indicative of the suitability of the FAS agent to be the primary FAS agent. The priority value may be derived from characteristics of the FAS agent and/or the network device on which the FAS agent executes. Each FAS agent may then claim the role of primary FAS agent by transmitting control packets to other FAS agents that includes the priority value. Upon being received by a particular FAS agent, the particular FAS agent may compare the priority value from the control packet to the priority value associated with the particular FAS agent. If the priority value of the control packet is greater than the priority value associated with the particular FAS agent, then the particular FAS agent may concede the role of primary to the other FAS agent. Otherwise, if the priority value of the particular FAS agent is higher than the priority values the other FAS agent, then the particular FAS agent becomes the primary FAS agent. The particular FAS agent may then transmit a control packet to the other FAS agents to confirm, to the other FAS agents, that the particular FAS agent is the primary FAS agent. In some instances, the particular FAS agent may periodically transmit the primary packet to the other FAS agents to maintain its status as the primary FAS agent. If, at any time, the particular FAS agent receives a priority value from another FAS agent that is greater than the priority value of the particular FAS agent, then the particular FAS agent may concede its status as primary FAS agent to that FAS agent. If the primary FAS agent fails, the other FAS agents may select a new primary FAS agent thereby providing fault tolerance and redundancy in the fabric network.

FAS agents may communicate with other FAS agents using resources of the network devices. In some instances, the FAS agents may use similar network channels relative to those that the network device uses to connect devices of the network. In other instances, the FAS agents may use an isolated communication channel of the network device. For instance, network devices may include a management channel that enables external devices to transmit commands to the network devices. A virtual local area network (VLAN) may be established using the management channel to facilitate communications of the FAS agents The VLAN may be a private network operated in parallel to the connections managed by the network devices that may be usable by FAS agents and network administrators. The VLAN may be inaccessible to devices of the fabric network (e.g., devices which depend on the network devices for connectivity).

The primary FAS agent may manage the configuration of the fabric network. The primary FAS agent causes changes in the configuration of a network device to be synchronized to the other network devices of the fabric network. For example, a command to modify the configuration of a particular network device of the fabric network can be propagated to the primary FAS agent. The primary FAS agent may authenticate the modification to the configuration causing the modification to the configuration to be propagated to other network devices in the fabric network. Similarly, if a current configuration is determined to cause errors, the FAS agents can propagate a rollback of the current configuration to a previous configuration. Modifying the configuration of network devices of the fabric network may be accomplished without having to individually modify each network device. In some instances, a modification to the confirmation may be obtained by the other network devices from the primary FAS agent. In other instances, the modification to the configuration may be obtained from a FAS agent executing on a network device operating the modified configuration.

Integrating FAS agents into Fabric networks may provide a number of advantages. FAS agents may improve the availability of the fabric by avoiding misconfigurations and inconsistent configurations, thereby reducing down-times and grey-outs. The FAS agents may also synchronize the state of individual network devices within the fabric network by propagating changes to the network to the FAS agents executing on each network device. A change in one network device may be authenticated and cause the same change to be implemented across the fabric network without having to individually modify each network device.

FIG. 1 depicts an example of a fabric of network according to aspects of the present disclosure. Fabric environment 100 may include multiple devices connected via one or more network devices. Fabric network 100 may include multiple network devices that are interconnected. Each network devices, such as network devices 104, 108, and 116, may include any type of device that facilitates communications such as, but not limited to, routers, gateways, network switches, proxy devices, or the like. The network devices may also maintain a connection between one or more other network devices or every other network device (e.g., as shown) to provide network security and communication redundancy for fabric network 100. The one or more other devices may be devices of any type from which communications originate or to which communications are addressed. Examples of devices that may be included in the one or more other devices include, but are not limited to, servers, computing devices, network devices, mobile devices, or the like.

Establishing fabric network 100 may include provisioning with a fabric availability and synchronization (FAS) agent on each network device. For instance, network device 104 may be provisioned with FAS agent 108, network device 112 may be provisioned with FAS agent 116 and network device 120 may be provisioned with FAS agent 124. Each FAS agent may establish a private connection with at least one other network device (and up to all other network devices). For example, each network device may include a management channel over which remote device may issue commands to the network devices. In some instances, each FAS agents may configure a virtual local area network (VLAN) over the management network. For example, FAS agent 108 may establish VLAN 128 on network device 104. FAS agent 116 may establish VLAN 128 on network device 112. FAS agent 108 may establish VLAN 128 on network device 120. The management channel may be an isolated channel from the connections managed by the network device. As a result, network devices may be configured to prevent devices of network environment 100 (other than network devices, 104, 108, and/or 112) from communicating over VLAN 116.

The first time a FAS agent executes, the FAS agent may determine which FAS agent in the fabric network will be the primary FAS agent. For instance, network device 104 may be the first network device added to the network. Once FAS agent 108 executes, FAS agent 108 may identify predetermined characteristics of network device 104 to derive a priority value. The predetermined characteristics may correspond to available bandwidth, available processing resources processor and/or memory, a quantity of devices connected to the network device, quality of a connection with another network device or server, combinations thereof, or the like. Since FAS agent 120 is the only FAS agent executing, FAS agent may be the primary FAS agent by default.

Network device 112 and network device 120 may be added to the fabric network. Once FAS agent 116 and FAS agent 124 are executed by network devices 112 and network device 120 respectively, FAS agent 116 and FAS agent 124 may determine a respective priority value. FAS agent 116 may broadcast its priority value to each other FAS agent (e.g., FAS agent 108 and FAS agent 124). Similarly, FAS agent 124 may broadcast its priority value to each other FAS agent (e.g., FAS agent 108 and FAS agent 116). In some instances, upon receiving the priority values from FAS agent 116 and FAS agent 124, FAS agent 108 may generate a new priority value (to ensure that the priority value reflects the current operating characteristics of network devices 104).

FAS agent 108 may determine if its priority value is greater than any of the received priority values. If FAS agent 108 includes the largest priority value, then FAS agent 108 may transmit a control packet over VLAN 116 to FAS agent 116 and FAS agent 124 declaring FAS agent 104 as the primary FAS agent of fabric network 100. In some instances, FAS agent 108 may also transmit its priority value over VLAN 116 such that FAS agent 116 and FAS agent 124 may independently verify that FAS agent 108 is the primary FAS agent. If the priority value of FAS agent 108 is not greater than the priority values of each of FAS agent 116 and FAS agent 124, FAS agent 108 may transmit a control packet over VLAN 128 relinquishing the role of primary FAS agent to the FAS agent with the larger priority value.

FAS agents may derive the priority value for the network device on which it executes at any time. In some instances, the priority value may be determined in regular intervals, upon receiving user input, upon receiving a command to generate and/or transmit a priority value from another network device, upon detecting the occurrence of an event (e.g., a configuration change, a change in network topology, a change in the processing resources of the network device, a change in the bandwidth or signal quality of the network device, combinations thereof, or the like), a combination thereof, or the like.

Fabric network 100 may facilitate communications between devices within fabric network 100 and communications between a device of fabric network 100 and external devices. For instance, network device 104 may manage connections with one or more servers 132, computing device 136-1, and computing device 136-2. Computing devices may be any type of network capable electronic device such as computers, mobile device (e.g., smartphones, wearable devices, or the like), servers, smart devices (e.g., network enabled automation devices, or the like), network devices, or the like. In some instances, a computing device may include one or more virtual devices. For instance, a computing device may operate one or more virtual machines, where each virtual machine may emulate a hardware platform. In those instances, network device 104 may facilitate communications for the computing device and each virtual machine (e.g., treated as a separately addressable and distinct computing device). Network device 112 may also include one or more servers 140 and computing devices 144-1 and 144-2. Network device 120 may include one or more servers 148 and computing devices 152-1 and 152-2.

In some instances, some devices may connect to two or more network devices. For instance, one or more servers 148 may maintain a connection with each of network device 112 and network device 120. In those instances, FAS agent 116 and FAS agent 120 may operate a joint subnet mask that defines an address for the one or more servers 148. The joint subnet mask may be based on dynamic routing protocols managed by the FAS agents that enable the FAS agents to route communications to one or more servers 148 over the connection network device 112 or the network device 120 based on the a current status of fabric network 100. The current status of fabric network 100 may be based on, but not limited to, a throughput through fabric network 100, processing resources available to network device 116 and/or network device 120, signal quality, network load of network device 116 and/or network device 120, combinations thereof, or the like. When a communication addressed to one or more servers 148, is received by fabric network 100, FAS agents may determine, using the joint subnet mask, which connection to use to route the communication to one or more servers 148.

Network devices of fabric network 100 may include a common configuration. For example, network device 104 may include a common configuration that is also included in network devices 116 and 120. In broadcast and mesh networks, modifying the configuration of a network device such as network device 104 (e.g., causing a configuration mismatch) may prevent communications addressed to downstream devices (e.g., such as devices 140, 144-1, 144-2, 148, 151-1, and 152-2) from being propagated through the network to the destination device. A network administrator may then have to connect to each network device individually to modify the configuration of each network device to match the configuration network device 104.

Fabric network 100 may automatically synchronize configuration changes through the network to prevent mismatching configurations and to ensure communications continue to propagate through the network when configurations are updated. For example, a modification to a configuration of network device 112 may be received. If network device 112 includes the primary FAS agent, then the primary FAS agent (e.g., FAS agent 116) may authenticate the configuration change. Authentication may include security authentication (e.g., to ensure that the modification was generated by an authorized user) and/or operational authentication (e.g., to ensure the modification will not disrupt the operation of fabric network 100 and/or disrupt communications transmitted through fabric network 100). If the modification is authenticated, FAS agent 116 increments the configuration version of the configuration of network device 112. FAS agent 116 may then transmit a control packet over VLAN 128 to FAS agent 108 and FAS agent 124 that provides the incremented version identifier of the configuration. FAS agent 108 and FAS agent 124 may then obtain the modification to the configuration of network device 112 (and/or the current configuration of network device 112) from network device 112 through VLAN 128.

If FAS agent 116 is not the primary FAS agent, then FAS agent 116 may transmit an identification of the modification to the primary FAS agent. The primary FAS agent may then authenticate the modification, and if authenticated, transmit the control packet over VLAN 128 to the other FAS agents.

A similar process may occur if a FAS agent determines that a current configuration is includes a fault. The FAS agent first determines if a rollback is needed by, for example, testing the configuration, determining there have been a predetermined quantity of reported faults, testing throughput through fabric network 100, determining if predetermined quantity of communications have failed to be delivered, combinations thereof, or the like. For example, if there is a fault in a current configuration of network device 104, FAS agent 108 may determine if a rollback is necessary. If so, FAS agent 108 may cause the network device to rollback to a previous configuration that may be known to be a good configuration. If FAS agent 108 is the primary FAS agent, then FAS agent 108 may cause network device 104 to revert to a previous, known-good configuration and decrement the version identifier of the configuration of network device 104 to the version identifier of the known-good configuration. FAS agent 108 may then transmit a control packet to FAS agent 116 and FAS agent 124 that includes an identification of the new (decremented) configuration version identifier.

If FAS agent 108 is not the primary FAS agent, then FAS agent 108 may transmit an identification of the rollback to the primary FAS agent. The primary FAS agent may then determine if the rollback is needed (e.g., using a similar process performed by FAS agent 108). If the rollback is needed, the primary FAS agent may perform the rollback on the network device of the primary FAS agent and transmit a control packet that includes the new (decremented) configuration identifier to each other FAS agent. The other FAS agents may perform a similar rollback (if the network devices of those FAS agents include an instance of the previous configuration) or obtain the previous configuration from the primary FAS agent.

Although three network devices are depicted (e.g., network devices 204, 212, and 220), each of which facilitating communications for three devices (e.g., devices 132, 136-1, 136-2, 140, 144-1, 144-2, 148, 152-1, and 152-2) any number of network devices may be operational within a fabric network. Each network device may facilitate communications of any number of devices.

Figure 2:
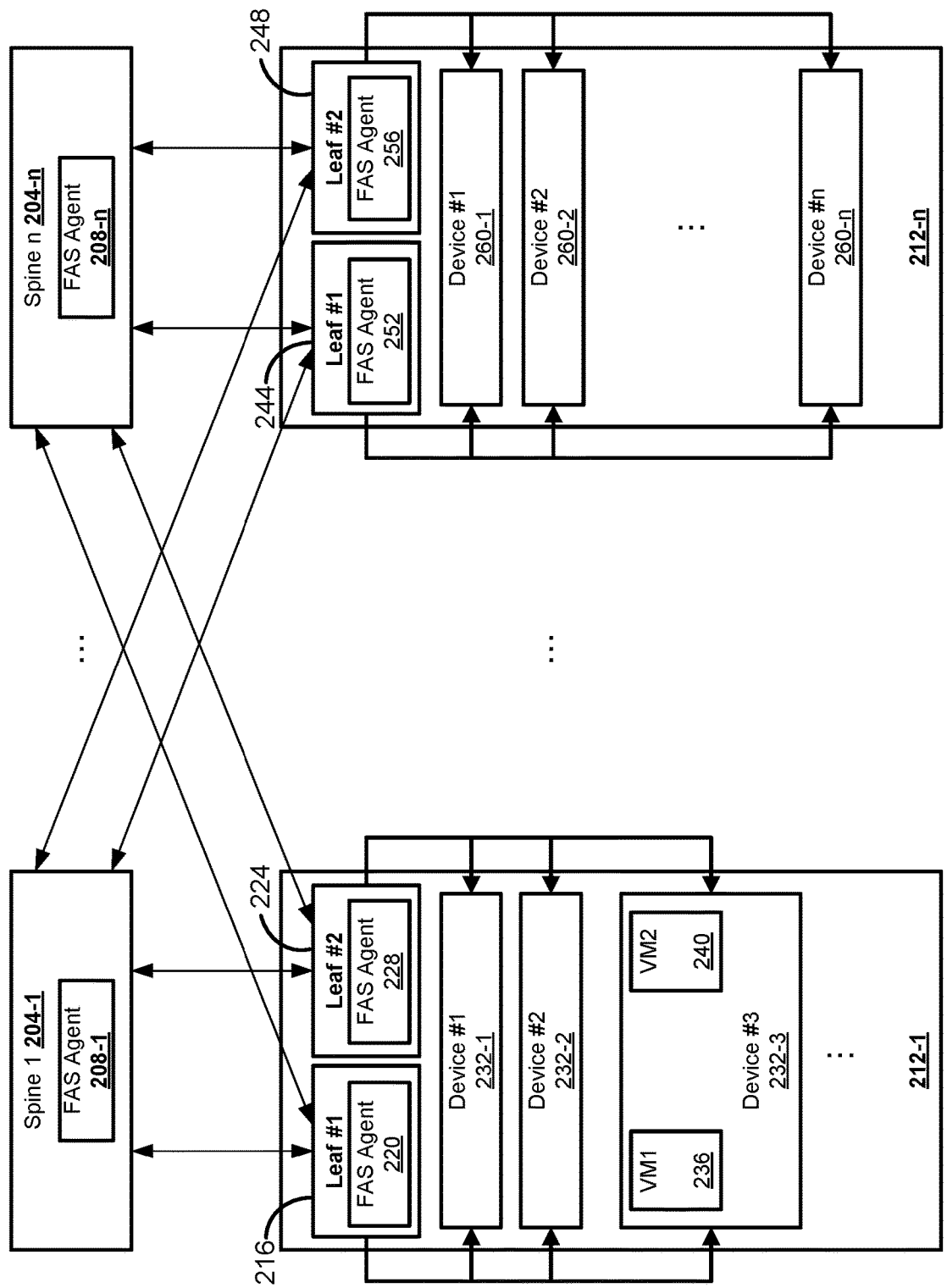
FIG. 2 depicts an example of a block diagram of a FAS managed network device according to aspects of the present disclosure.

FIG. 2 depicts an example of a block diagram of a FAS-managed network device according to aspects of the present disclosure. Fabric networks such as fabric network 100 of FIG. 1 may be employed in different types of environment such as enterprise networks, control centers, residential networks, or the like. Some environments such as control centers may use a spine-leaf architecture. A spine layer (e.g., spine devices 204-1-204-n) may include network devices that interconnect leaf layer devices into a mesh network topology. Each spine device may be provisioned with a respective FAS agent (e.g., FAS agent 208-1 may execute on spine 1 204-1 and FAS agent 208-n may execute on spine n 204-n, etc.).

A leaf layer (e.g., computing devices 212-1-212-n) may include access devices that aggregate traffic from servers, client devices, user devices, or the like. Computing devices 212-1-212-n may include one or more leaves (such as leaves 2167, 224, 244, and 248) that each include one or more FAS agents (such as FAS agents 220, 228, 252, and 256) that manage network operations of one or more devices incorporated within computing devices 212-1-212-n. For instance, computing device 212-1 may include leaf 216 that executes FAS agent 220 and leaf 224 that executes FAS agent 228. FAS agent 220 may execute to manage network operations of devices 232-1, 232-2, 232-3, etc. Devices 232-1, 232-2, 232-3, etc. may include computing devices that operate within the control center. In some instances, computing device may incorporate other devices (e.g., physically or virtual). For instance, device 232-3 may be a physical computing device that executes virtual machine 236 and virtual machine 240. Virtual machine 236 and virtual machine 240 may execute to emulate a different execution environment for one or more other devices (e.g., client devices, user devices, other computing devices, etc.) or to provide an execution environment configured for the execution of particular applications.

Leaf device 216 (and FAS agent 220) and leaf layer 224 (and FAS agent 228) may each manage devices 232-1, 232-2, 232-3, etc. through different communication channels (e.g., as shown) or through a same communication channel (not shown). Leaf layers may manage any number of devices in addition to devices 232-1, 232-2, 232-3 as shown. Each device managed by a leaf layer may execute any number of virtual environments. For example, computing device 212-n includes leaf 244 that executes FAS agent 252 and leaf 248 that executes FAS agent 256. Each of leaf 244 and leaf 256 may manage devices 260-1, 260-2-260-n.

Each leaf may be connected to each spine to enable management redundancy within each computing device of the leaf layer. For instance, if leaf 216 were to fail or become unresponsive, leaf 224 may continue to manage devices 232-1, 232-2, and 232-3. In addition, since leaf 224 maintains independent connections to spine 204-1-204-n and FAS agents 208-1-208-n, the FAS agents within the fabric network may continue to manage the network operations of each device (physical or virtual) within the fabric network. For instance, with leaf 216 disabled, FAS agent 228 of leaf 224 may continue to communicate with FAS agent 208-1-208-n of the spine layer.

The FAS agents may communicate with each other to determine which FAS agent will be the primary FAS agent. In some instances, the FAS agents may communicate over an independent management channel. For instances, the FAS agents may establish a VLAN over the independent management channel to establish communications with other FAS agents that are separate from network operations managed by FAS agents. Since the FAS agents operate redundant network management operations, the control center may not have to allocate outsides hosts and/or servers to manage redundancy or network operations (as redundancy and network operations are managed by the FAS agents).

A control center administrator may execute commands across an entire fabric network, by executing a command on a single device managed by a FAS agent. The FAS agent may identify the command to the primary FAS agent. The primary FAS agent may authenticate the command and propagate the command to other FAS agents. The other FAS agents may then execute the command on the devices on which those FAS agents manage. A peer-to-peer election protocol (e.g., over the VLAN) may provide synchronization within the fabric network. In some instances, a state machine may be used by the FAS agents to manage the synchronization of configurations and commands.

Figure 3:
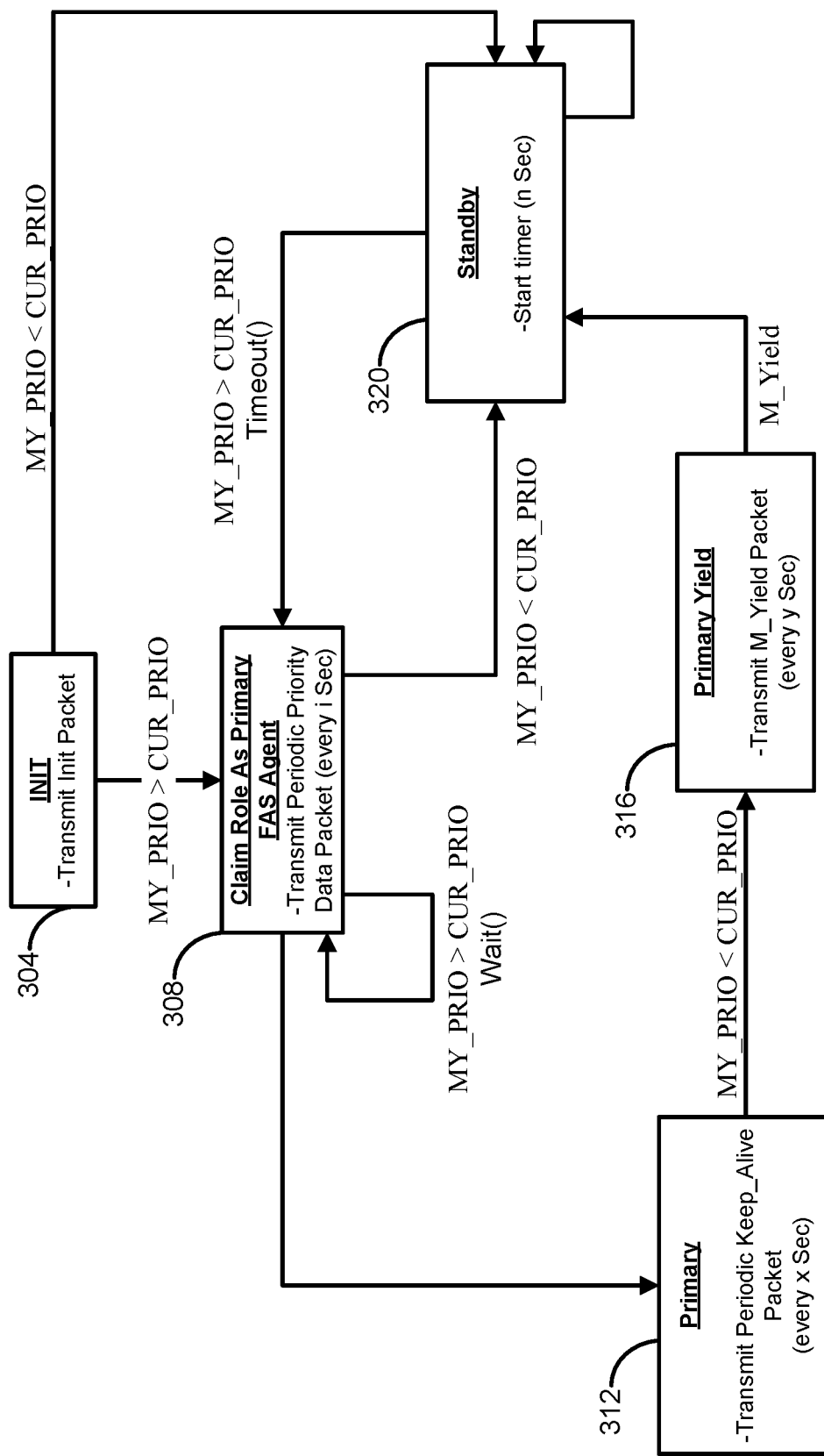
FIG. 3 depicts an example of a process for selecting a primary FAS agent, according to aspects of the present disclosure.

FIG. 3 depicts an example of a process for selecting a primary FAS agent, according to aspects of the present disclosure. The process when a FAS agent is initialized at block 304. FAS agent may be initialized when first provisioned (e.g., the first time the FAS agent executes on a network device) or when network device is added to a fabric (or any other type of network). For instance, a FAS agent that is already executing on a network device when the network device is added to the network may be initialized. At block 304, the FAS agent may determine a priority value based on characteristics of the network device on which the FAS agent executes. The priority value may be based on one or more performance metrics of the network device including, but not limited to, currently available processing resources (e.g., memory and/or processor resources), throughput to one or more devices managed by the network device, bandwidth, signal quality, number of devices managed by the network device, physical proximity to other network devices, or combinations thereof, or the like.

The FAS agent may compare its priority value with the current priority value. The current priority value may be the priority value of the current primary FAS agent. If the FAS agent determines that the priority value of the network device is higher than the current priority value than the process continues to block 308. If the FAS agent determines that the priority value of the network device is lower than the current priority value than the process continues to block 320, where the FAS agent may start a timer for a predetermined time interval (e.g., n seconds) and wait.

At block 308, the FAS agent claims the role of primary FAS agent in response to determining that the priority value of the FAS agent is higher than the current priority value. The current priority value may be set to the priority value the FAS agent. The FAS agent may transmit a priority control packet when the predetermined time interval expires (e.g., every i seconds). The priority control packet may be transmitted over a VLAN established by the FAS agents of the fabric network. The priority control packet may provide an indication to the other FAS agents executing in the fabric network that this FAS agent is the current primary FAs agent.

The FAS agent may then execute two parallel processes. During the first process, the FAS agent may compare the priority value of the FAS agent with the current priority value. If the priority of the FAS agent is greater than or equal to the current priority value, then the process waits for a predetermined time interval and returns to block 208. This process may be repeated for as long as the priority value of the FAS agent greater than or equal with the current priority value.

The (now) primary FAS agent may then continue to block 312 in which the FAS executes the role of primary FAS agent (e.g., synchronizing the operation of the network devices within the fabric network with other FAS agents). At block 312, the primary FAS agent may transmit a keep_alive control packet every x seconds. The keep_alive control packet may include an indication of the current configuration of the network device of the primary FAS agent (which should be the configuration of each network device of the fabric network). FAS agents executing on other network devices may then determine if the network devices are executing the configuration version indicated in the keep_alive control packet. If so, then those FAS agents may not execute any additional processing. If a FAS agent determines that the network device on which it executes is not executing the configuration version identified by the keep_alive control packet, then the particular FAS agent may acquire the current configuration version.

In some instances, the fabric network may operate a pull model. In those instances, the particular FAS agent may use the keep_alive control packet to determine where to acquire the current configuration version. For instance, the keep_alive control packet may include an identification of a controlbase or repository from which the particular FAS agent may obtain the current configuration version. The particular FAS agent may transmit a control packet to the primary FAS agent indicating that the particular FAS agent is in the process of updating the configuration of the network device on which the particular FAS agent executes. The particular FAS agent may transmit another control packet to the primary FAS agent indicating that the configuration version of network device is now current. In a push model, the particular FAS agent may receive the current configuration version from the primary FAS agent (e.g., in the keep_alive control packet, upon request from the particular FAS agent, or the like).

The primary FAS agent may periodically receive priority values from other FAS agents. For instance, each FAS agent may transmit that FAS agent's priority value in predetermined time intervals (e.g., every n seconds according to block 320), upon receiving user input, and/or upon detecting the occurrence of an event (e.g., network topology changed such as new devices being added to the fabric network or devices being removed from the fabric network, a predetermined change in throughput, a predetermined change in bandwidth, a predetermined change in processing resources, a predetermined change in signal or channel quality, combinations thereof, or the like). In some instances, the primary FAS agent may also update its priority value in predetermined time intervals, upon receiving user input, and/or detecting the occurrence of the event.

If the priority value of the primary FAS agent is greater than the received priority values, then the primary FAS agent may continue to transmit the keep_alive control packet every x seconds). If the priority value of the primary FAS agent is not greater than any of the received priority values, then the two parallel processes may stop processing blocks 308 and 312 respectively. For example, the first parallel process may stop executing block 308 and continue to block 320 where the FAS agent may initiate a timer (e.g., n seconds in length) and wait. The second parallel process may stop executing block 312 and continue to block 316.

At block 316, the primary FAS agent may transmit an m_yield control packet to the FAS agent that has the highest priority value. In some instances, the primary FAS agent may transmit the m_yield control packet to each FAS agent in the fabric network such that each FAS agent may then expect a new primary control packet from the FAS agent that is to be the new primary FAS agent. The designation of the primary FAS agent may then be modified to remove the role of primary (e.g., the primary FAS agent becomes a regular FAS agent). The process for the (now non-primary) FAS agent continues to block 320. In some instances, the second parallel process may reach block 320 at the same time as the first parallel process. The two parallel processes of the FAS agent may then merge into a single process (e.g., one of the parallel processes may be terminated).

In some instances, at the expiration of the timer (e.g., after n seconds) at block 320, the FAS agent may generate a new priority value. Alternatively, the FAS agent may generate a new priority value during the time interval of the timer (e.g., before the timer expires). Alternatively, still, the FAS agent may retain the previous priority value. For instance, the fabric network and/or the network device on which the FAS agent executes have not changed since the last time the FAS agent generated the priority level, the FAS agent may continue to use that priority level for future primary FAS agent determinations.

The FAS agent may then compare the priority value of the FAS agent with the priority value of the current primary FAS agent. If the priority value of the FAS agent is greater than the priority value of the current primary FAS agent, the process returns to block 308. The FAS agent becomes the primary FAS agent and transmits the primary control packet to the previous primary FAS agent indicating that the FAS agent is the new primary FAS agent. If the priority value of the FAS agent is greater than the priority value of the current primary FAS agent, the process remains at block 320. The FAS agent restarts the timer (e.g., that corresponds to an n second time interval) and waits. When the timer expires (e.g., after n seconds), the FAS agent may again determine if the priority value of the FAS agent is greater than the priority value the current primary FAS agent. The timer at block 320 may be repeated indefinitely, until, at the expiration of the predetermined time interval, the FAS agent determines that the priority value of the FAS agent is greater than the priority value of the current primary FAS agent.

Figure 4:
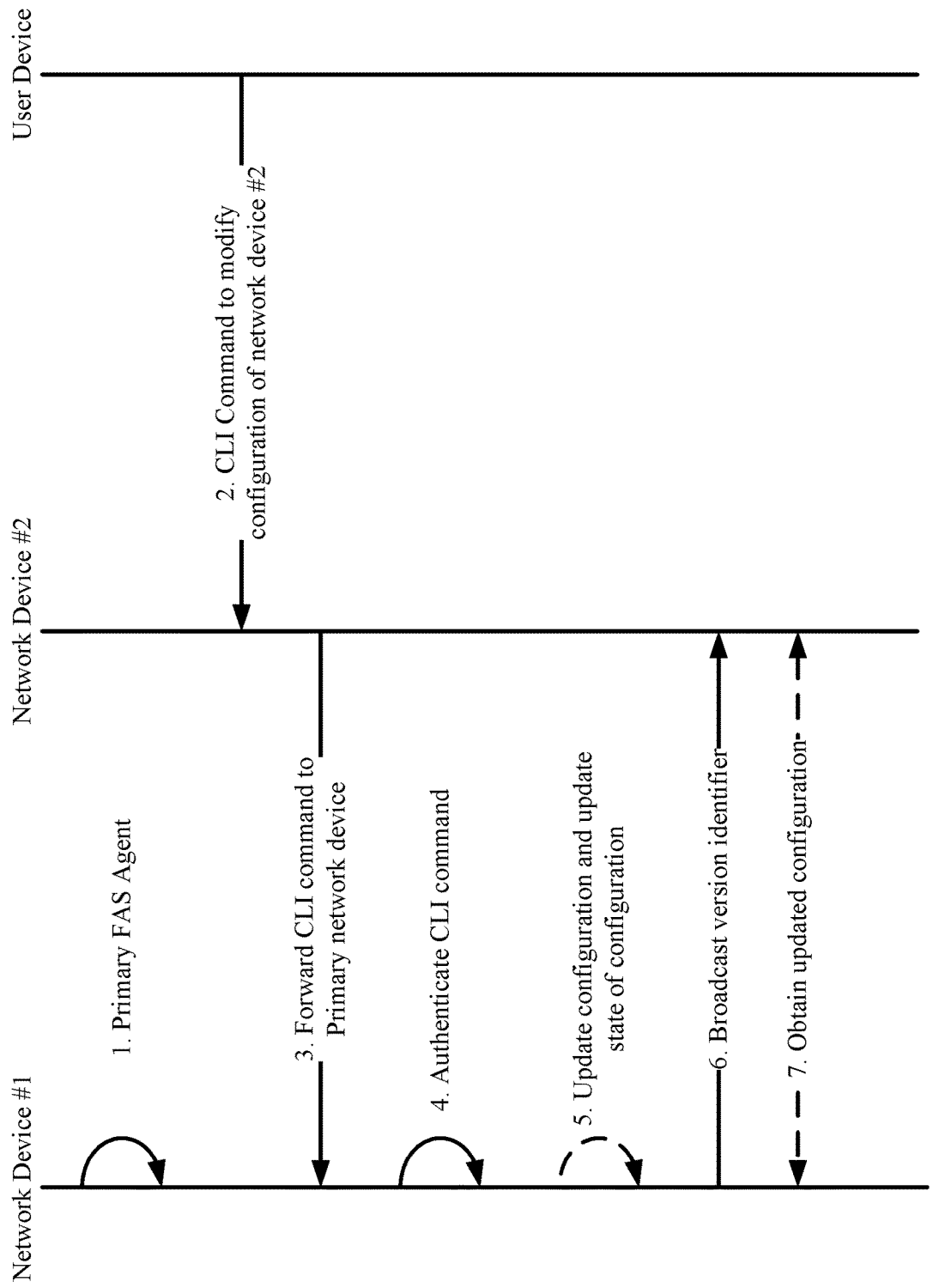
FIG. 4 depicts an example of a process for managing a configuration of a fabric of network devices, according to aspects of the present disclosure.

FIG. 4 depicts an example of a process for managing a configuration of a fabric of network devices, according to aspects of the present disclosure. FAS agents may synchronizes configuration states of the network devices of a fabric network. In some instances, the FAS agents may use a state machine which characterizes the current configuration as a discrete state. Any change to the configuration may be characterized as a new state by the state machine with the change to the configuration being identified as a means to transition from the previous state to the new state. The FAS agents may store the identification of the change locally (e.g., in each FAS agent) or in a repository. An FAS agent executing on a network device operating an old configuration state may upgrade to the current state by implementing the identification of the change to the configuration. That FAS agent may obtain the identification of the change to the configuration from an FAS agent executing on a network device operating the current state (e.g., such as the primary FAS agent or an agent that already upgraded) or from the repository.

Alternatively, the configuration of the network devices may be assigned a version identifier. When a configuration is changed, the version identifier of the configuration may be incremented to indicate the new configuration. The FAS agents may store an identification of the change to the configuration with each FAS agent and/or at a repository accessible by the FAS agents. An FAS agent operating on a network device with an old version identifier may upgrade to the current version identifier by obtaining the identification of the change to the configuration from an FAS agent that already upgraded or from the repository. In addition, if the current configuration is faulty, the FAS agent by rollback (e.g., decrement) the version identifier using the identification of the change to undo the change to the modification. Each change to the configuration may cause the version identifier to increment by a predetermined amount. As a result, a FAS agent may determine, from a difference between a current version identifier of the network device on which it operates and an incremented version identifier associated with another network device, a degree in which the configuration may have been changed.

The process may begin (at step 1) with the primary FAS agent operating on network device retaining the primary role (e.g., waiting to process input from another FAS agent or from a user device). At step 2, a command line interface (CLI) command may be received by network device 2. The CLI command may be received from a user device and correspond to a modification to the configuration of network device 2. A FAS agent executing on network device 2 may detect the modification before it is implemented and authenticate the modification. Authenticating the modification may include determining that modification was received from an authenticated user device and/or an authenticated user (e.g., a network administrator with proper credentials). Alternatively, or additionally, authenticating the modification may also include determining that the modification will not disrupt communications from being reaching devices within the network (e.g., the modification will not break the network). Authenticating the modification in this manner may include determining, for example, from previous configurations, from a simulation of the modification, from a confirmation (e.g., such as from user input or the like), from a hash value, or like, to determine that the modification will not disrupt the operation of the network.

At step 3, the FAS agent of network device 2 may forward an identification of the modification to the primary FAS agent of network device 2. At step 4, the primary FAS agent may authenticate the modification. The primary FAS agent may authenticate the modification in the same manner as described above in connection to the FAS agent of network device 2. In some instances, the primary FAS agent may authenticate the modification in place of the FAS agent of network device 2. In other instances, the primary FAS agent may authenticate the FAS agent after the FAS agent of the network device 2 authenticated the modification. In still yet other instances, the primary FAS agent and the FAS agent of the network device 2 may authenticate the modification in parallel. In order to be authenticated, the modification may me authenticated by both the primary FAS agent and the FAS agent of network device 2. Alternatively, the modification may be authenticated if either the primary FAS agent or the FAS agent of network device 2 authenticates the modification.

If the modification is authenticated, then (at step 5) the primary FAS agent implements the modification to the configuration of network device 1 and updates the state of the configuration (e.g., via the state machine). Alternatively, if version identifiers are used, the primary FAS agent increments the version identifier of configuration of network device 1. The primary FAS agents may store the modification in a repository that may be accessible to other FAS agents of the network.

At step 6, the primary FAS agent my broadcast keep_alive control packet that indicates the current state (or version identifier) of the configuration of network device 1. The keep_alive control packet may be received by the FAS agents connected to the primary FAS agent. If there are other FAS agents operating in the network that are not connected to the primary FAS agent, then the FAS agents connected to the primary FAS agent may forward the keep_alive control packet to those FAS agents.

At step 7, the FAS agent of network device 2 (as well as any other FAS agent operating within the network), upon receiving the keep_alive control packet, may obtain the modification to the configuration. In some instances, the FAS agent of network device 2 may obtain the modification from a FAS agent that is executing on a network device operating the updated configuration (e.g., based on the state or version identifier matching the keep_alive control packet) such as the primary FAS agent. Alternatively, the FAS agent of network device 2 may execute a query at the repository using the state or version identifier. The repository may return the modification to the requesting FAS agent. The FAS agent may then implement the modification to the configuration and synchronize the state (or version identifier) with the other network devices of the network.

Figure 5:
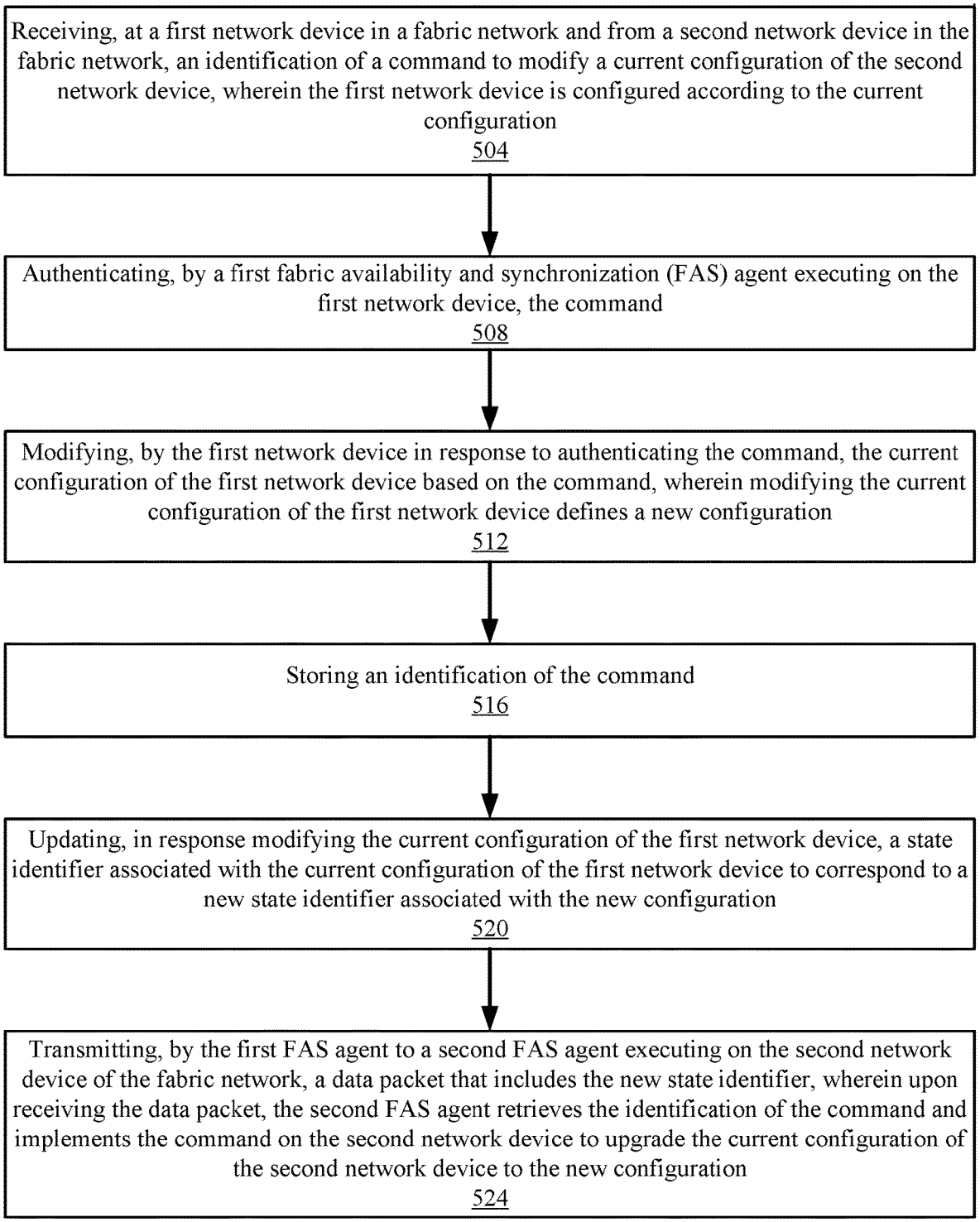
FIG. 5 depicts an example of a process for updating a configuration of a fabric of network devices, according to aspects of the present disclosure.

FIG. 5 depicts an example of a process for updating a configuration of a fabric of network devices, according to aspects of the present disclosure. At block 504, a first network device of a fabric network may receive an identification of a command from a second network device. The command may correspond to a modification of a current configuration of the second network device. The first network device may operate a same current configuration as the second network device. In some instances, the second network device may receive the command from a user device through a command line interface.

The fabric network may include two or more network devices (e.g., the first network device and the second network device as well as optionally any number of additional network devices). Each network device may include a device that facilitates communications for one or more other devices. Examples of network devices may include, but are not limited to, routers, gateways, switches, servers, or the like).

The first network device may receive the command from the second network device over a virtual local area network. For instance, network devices of the fabric network may each include a management channel managing the operations of the respective network device. FAS agents executing on the network devices may establish a VLAN over the management channel. The VLAN may be isolated from the devices that the network devices facilitate communications for. That is the VLAN may not be operated by the same communication channels that the network devices uses for devices of which the network devices provide communication services to. The VLAN may only be accessible to manage the operations of the fabric network.

At block 508, a first FAS agent executing on the first network device may authenticate the command. Authenticating the modification may include determining that modification was received from an authenticated user device and/or an authenticated user (e.g., a network administrator with proper credentials). Alternatively, or additionally, authenticating the modification may also include determining that the modification will not disrupt communications from being reaching devices within the network (e.g., the modification will not break the network). The first FAS agent may determine that the command will not disrupt the fabric network by, for example, analyzing previous configurations, simulating of the modification, receiving a confirmation (e.g., such as from user input or the like), matching a hash value to a stored hash value, or like. If the command is not authenticated, then the command may be discarded and the process may return to block 504 and wait for a new command to be received. If the command is authenticated, then the process continues to block 512.

At block 512, the first FAS agent may cause the modification of the current configuration of the first network device based on the command. For instance, modifying the current configuration of the first network device defines a new configuration of the first network device. In some instances, the first network device may test the new configuration. For example, testing the new configuration may include executing unit tests, transmitting packets to a predetermined device (e.g., such as the user device or the like) and monitoring for a response, executing a test application, or the like. If the test fails, the configuration of the first network device may be rolled back from the new configuration to the previous configuration.

At block 516, an identification of the command may be stored. In some instances, the identification of the command may be stored by the first FAS agent (optionally, every FAS agent that caused the command to be implemented on a respective network device. In other instances, the command may be stored in a controlbase that is accessible to network devices of the fabric network. FAS agents may query the controlbase using a state associated with the command (e.g., such as the new state described below) and/or the identification of the command to retrieve the command from the controlbase.

At block 520, a state identifier associated with the current configuration of the first network device may be updated to correspond to a new state identifier associated with the new configuration. The state identifier represents a state of a configuration of the network device. Since the configuration of each network device may be a combination of finite properties, the quantity of unique combinations of properties (e.g., configurations) may also be finite. As a result, a particular configuration of a network device may be represented as one of a finite set of states of a state machine. When the configuration of the network device is changed, the state of the configuration changes (commensurate with the change being made and corresponding to a new combination of properties). The state identifier representing the state of the old configuration of the network device may be updated to a new state identifier to represent the new state. Examples of properties that may be included within a combination of properties making up a configuration include, but are not limited to, Hostname, console passwords, enabling or disabling specific ports, assignment of default gateway, enabling management channel, Internet Protocol address configuration, subnet mask configuration, and the like.

The state identifier may be used to query the controlbase (or another FAS agent). The controlbase may return an identification of one or more commands that can be implemented by network device to cause the current configuration of the network device to be upgraded to the new configuration. In some instances, the query may also include the state identifier (e.g., associated with the current state before any modifications to the configurations have been performed). The controlbase may use the state identifier associated with the current state and the new state identifier to return commands that may upgrade a network device operating any configuration to the new configuration.

In some instances, the one or more commands may correspond to the command received by the second network device. In other instances, the one or more commands may be identified based on characteristics of the device that generated the query. For instance, some network devices may operate different hardware and/or firmware than other network devices. Although each network device may be configured according to a same configuration, the commands to cause a network device to operate a new configuration may be different for different network devices. As a result, the controlbase may generate a query response that include an identification of one or more commands that when implemented by the requesting network device may cause the requesting network device to be upgraded to a same new configuration as other network devices.

At block 524, the first FAS agent executing on the first network device may transmit a control packet that includes the new state identifier over the VLAN to a second FAS agent executing on the second network device. When the second FAS agent receives the control packet, the second FAS agent may retrieve an identification of the command. In some instances, the second FAS agent may request identification of the command from the first FAS agent (or another FAS agent that has already implemented the command). In other instances, the second FAS agent may query the controlbase using the new state identifier. The second FAS agent may then implement the command on the second network device to upgrade the configuration of the second network device to the new configuration.

If the second FAS agent determines that the new configuration is not operational (e.g., detecting predetermined quantity of packets being dropped, communication failures, software faults, or the like). The second FAS agent may transmit a communication to the first FAS agent indicating that the configuration of the fabric network should be rolled back to the previous configuration. The first FAS agent may authenticate the communication and transmit a new control packet with the state identifier of a previous known-good configuration. The new control packet may cause other network devices of the fabric network to also revert to the previous known-good configuration such that the configuration of the fabric network may be consistent.

In some instances, if the first FAS agent detects a connection failure associated with a network device of the fabric network, the first FAS agent may not modify the configuration of the first network device (or allow modifications to any network device of the fabric network). For instance, if a command is received after the first FAS agent detects a connection failure in a network device, the first network device may store the command. Once the connections of the affected network device are restored, the first FAS agent may retrieve the command and implement the command (e.g., performing blocks 508-524). Alternatively, the first FAS agent may discard the command. Once the connections of the affected network device are restored, the first network device may accept commands to modify the configuration of network devices of the fabric network.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a control flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, control structures, and/or program statements. A code segment may be coupled to another code segment or a hardware circuit by passing and/or receiving information, control, arguments, parameters, and/or memory contents. Information, arguments, parameters, control, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing control, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or control.

While the principles of the disclosure have been described above in connection with specific apparatuses and methods, it is to be clearly understood that this description is made only by way of example and not as limitation on the scope of the disclosure.

What is claimed is:

1. A computer-implemented method, the method comprising:

receiving, by a first network device of a plurality of network devices in a fabric network that includes one or more communication channels between the plurality of network devices, a command from a second network device of the plurality of network devices, wherein the command is associated with modification of a configuration of the second network device;

authenticating, by the first network device, the command by determining, at least in part, that modifying the configuration of the second network device based on the command will continue a communication between the plurality of network devices through the one or more communication channels;

in response to authentication of the command, modifying, by the first network device, the configuration of the first network device based on the command by defining a new configuration for the first network device;

executing, by the first network device, a test on the new configuration by transmitting a test signal to at least one network device of the plurality of network devices;

approving, by the first network device, the new configuration based on a positive response of the test executed on the new configuration;

updating, by the first network device, a state identifier associated with the configuration of the first network device to correspond to a new state identifier associated with the new configuration; and transmitting, by the first network device to the second network device using the one or more communication channels, a control packet that includes the new state identifier, wherein the control packet is configured to trigger the second network device to retrieve modification information from a shared repository and to update the configuration of the second network device to the new configuration based on the modification information.

2. The computer-implemented method of claim 1, wherein the first network device stores an indication of change to the new configuration at the shared repository accessible by each network device of the plurality of network devices.

3. The computer-implemented method of claim 1, wherein the new state identifier is an increment version of the state identifier.

4. The computer-implemented method of claim 1, wherein the first network device transmits the control packet to each network device of the plurality of network devices for updating the configuration.

5. The computer-implemented method of claim 1, wherein the modification information is retrieved from the shared repository by executing a query at the shared repository by the second network device.

6. A system comprising:
one or more processors; and
a non-transitory computer-readable medium storing instructions that when executed by the one or more processors, cause the one or more processors to perform operations including:
receiving, by a first network device of a plurality of network devices in a fabric network that includes one or more communication channels between the plurality of network devices, a command from a second network device of the plurality of network devices, wherein the command is associated with modification of a configuration of the second network device;
authenticating the command by determining, at least in part, that modifying the configuration of the second network device based on the command will continue a communication between the plurality of network devices through the one or more communication channels;
in response to authentication of the command, modifying the configuration of the first network device based on the command by defining a new configuration for the first network device;
executing, by the first network device, a test on the new configuration by transmitting a test signal to at least one network device of the plurality of network devices;
approving, by the first network device, the new configuration based on a positive response of the test executed on the new configuration;
updating a state identifier associated with the configuration of the first network device to correspond to a new state identifier associated with the new configuration; and
transmitting, to the second network device using the one or more communication channels, a control packet that includes the new state identifier, wherein the control packet is configured to trigger the second network device to retrieve modification information from a shared repository and to update the configuration of the second network device to the new configuration based on the modification information.

7. The system of claim 6, wherein the first network device stores an indication of change to the new configuration at the shared repository accessible by each network device of the plurality of network devices.

8. The system of claim 6, wherein the new state identifier is an increment version of the state identifier.

9. The system of claim 6, wherein the first network device transmits the control packet to each network device of the plurality of network devices for updating the configuration.

10. The system of claim 6, wherein the modification information is retrieved from the shared repository by executing a query at the shared repository by the second network device.

11. A non-transitory computer-readable medium storing instructions that when executed by one or more processors, cause the one or more processors to perform operations including:
receiving, by a first network device of a plurality of network devices in a fabric network that includes one or more communication channels between the plurality of network devices, a command from a second network device of the plurality of network devices, wherein the command is associated with modification of a configuration of the second network device;
authenticating the command by determining, at least in part, that modifying the configuration of the second network device based on the command will continue a communication between the plurality of network devices through the one or more communication channels;
in response to authentication of the command, modifying the configuration of the first network device based on the command by defining a new configuration for the first network device;
executing, by the first network device, a test on the new configuration by transmitting a test signal to at least one network device of the plurality of network devices;
approving, by the first network device, the new configuration based on a positive response of the test executed on the new configuration;
updating a state identifier associated with the configuration of the first network device to correspond to a new state identifier associated with the new configuration; and
transmitting, to the second network device using the one or more communication channels, a control packet that includes the new state identifier, wherein the control packet is configured to trigger the second network device to retrieve modification information from a shared repository and to update the configuration of the second network device to the new configuration based on the modification information.

12. The non-transitory computer-readable medium of claim 11, wherein the first network device stores an indication of change to the new configuration at the shared repository accessible by each network device of the plurality of network devices.

13. The non-transitory computer-readable medium of claim 11, wherein the new state identifier is an increment version of the state identifier.

14. The non-transitory computer-readable medium of claim 11, wherein the first network device transmits the control packet to each network device of the plurality of network devices for updating the configuration.

15. The non-transitory computer-readable medium of claim 11, wherein the modification information is retrieved from the shared repository by executing a query at the shared repository by the second network device.

* * * * *